United States Patent [19]

Andersen

[11] Patent Number: 6,121,886
[45] Date of Patent: Sep. 19, 2000

[54] METHOD FOR PREDICTING FAULT CONDITIONS IN AN INTELLIGENT ELECTRONIC DEVICE

[75] Inventor: Bo L. Andersen, Burlington, Conn.

[73] Assignee: General Electric Company, Schenectady, N.Y.

[21] Appl. No.: 09/313,795

[22] Filed: May 18, 1999

[51] Int. Cl.[7] .................................................. G08B 21/00
[52] U.S. Cl. ........................ 340/635; 340/638; 340/644; 361/93
[58] Field of Search .................................... 340/635, 638, 340/644; 361/93

[56] References Cited

U.S. PATENT DOCUMENTS 4,672,501  6/1987  Bilac et al. .............................. 361/96
5,490,086  2/1996  Leone et al. ............................ 364/492
5,793,594  8/1998  Niemira et al. ......................... 361/93

Primary Examiner—Edward Lefkowitz
Attorney, Agent, or Firm—Cantor Colburn LLP; Carl B. Horton

[57] ABSTRACT

A method of predicting an eminent circuit breaker trip condition using an intelligent electronic device such as a trip unit, a protective relay, a power meter or other IED is presented. The intelligent electronic device includes a microcontroller and associated memories. An algorithm (program) stored in a memory of the intelligent electronic device generates a near-trip event for each trip event calculation if preset thresholds for the measured parameters are breached.

22 Claims, 1 Drawing Sheet

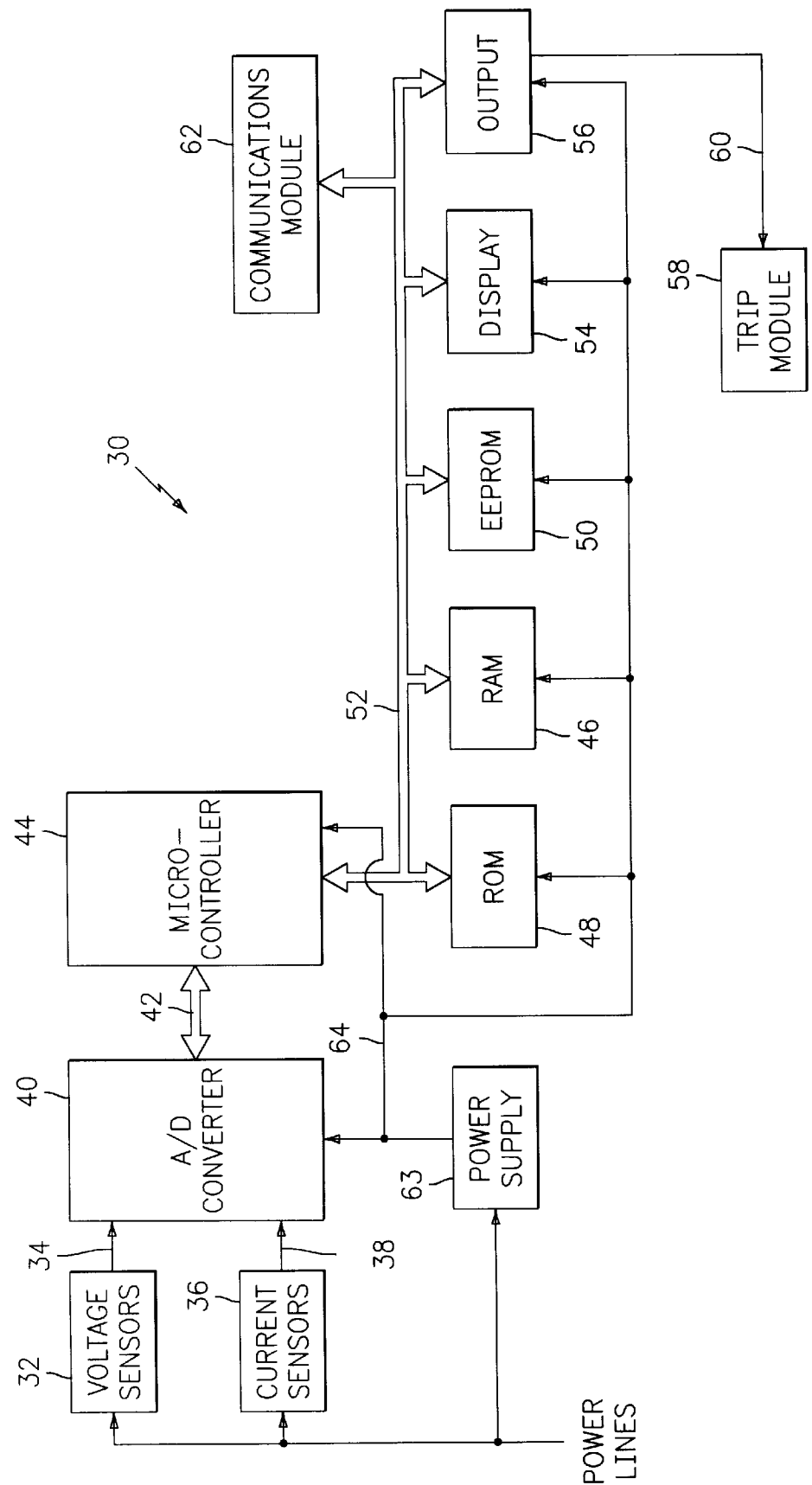

METHOD FOR PREDICTING FAULT CONDITIONS IN AN INTELLIGENT ELECTRONIC DEVICE

FIELD OF THE INVENTION

The present invention relates generally to intelligent electronic devices (e.g., electronic trip units or protective relays). More specifically, the present invention relates a method of predicting fault conditions in an intelligent electronic device (e.g., an electronic trip unit or protective relay).

BACKGROUND OF THE INVENTION

Intelligent electronic devices are well known. By way of example, an electronic trip unit (one such intelligent electronic device) typically comprises voltage and current sensors which provide analog signals indicative of the power line signals. The analog signals are converted by an A/D (analog/digital) converter to digital signals which are processed by a microcontroller. The trip unit further includes RAM (random access memory), ROM (read only memory) and EEPROM (electronic erasable programmable read only memory) all of which interface with the microcontroller. The ROM includes trip unit application code, e.g., main functionality firmware, including initializing parameters, and boot code. The EEPROM includes operational parameters for the application code.

While the trip unit serves to protect devices, many times at the point that a fault has occurred and the unit is tripped (i.e., a trip event) damage and costly delays to facility operations occur. For example, a plant that is shut down may take several hours to restart, a pharmaceutical production batch may be scrapped, a data center may become inoperational and shut down an entire corporation, or a valuable experiment may be lost at a government laboratory or university. A single trip event may cost a company millions of dollars.

SUMMARY OF THE INVENTION

It is a feature of the present invention to predict a fault in an intelligent electronic device prior to the occurrence of a fault which would result in a trip event. It is also a feature of the present invention to avoid or prepare for the occurrence of a trip event.

These and other features of the invention are achieved by the method of fault prediction in an intelligent electronic device (IED) utilizing a fault prediction algorithm in the microcontroller of the IED (e.g., an electronic trip unit or protective relay) of the present invention. An electronic trip unit is described herein by way of example only, as the present invention applies to other IEDs as well. The electronic trip unit comprising voltage and current sensors which provide analog signals indicative of the power line signals. The analog signals are converted by an A/D (analog/digital) converter to digital signals which are processed by a microcontroller. The trip unit further includes RAM (random access memory), ROM (read only memory) and EEPROM (electronic erasable programmable read only memory) all of which communicate with the microcontroller. The ROM includes trip unit application code, e.g., main functionality firmware, including initializing parameters, and boot code. The application code includes code for the fault prediction algorithm of the present invention. The EEPROM includes operational parameters, e.g., code for setting near-trip event thresholds, for the application code. These parameters may be stored in the trip unit at the factory and are selected to meet customers' requirements, but can also be remotely downloaded.

In an exemplary embodiment of the invention, for any of the events that are calculated the fault prediction algorithm calculates a near-trip event utilizing the following logic:
IF( (preset trip condition less actual observed value) divided by preset trip condition $\geq$ customer input near-trip event threshold percentage) THEN issue near-trip event.

The ability to determine and monitor near-trip event conditions has great diagnostic value for facility distribution systems having mission critical operations. This is because many facility fault conditions do not occur spontaneously but rather develop gradually over time. By monitoring near-trip events these fault conditions may be predicted, detected, and corrected before an actual costly trip event does occur. Therefore, potentially saving a mission critical facility millions of dollars in delay time or damages.

The above discussed and other features and advantages of the present invention will be appreciated and understood by those skilled in the art from the detailed description and drawings.

BRIEF DESCRIPTION OF THE DRAWINGS

Referring now to the drawings wherein the FIGURE is a schematic block diagram of an electronic trip unit.

DETAILED DESCRIPTION OF THE PREFERRED EMBODIMENTS

Referring to the FIGURE, a general schematic of a trip unit is generally shown at 30. It will be appreciated that the present invention is not limited to electronic trip units but is directed IEDs in general. Trip unit 30 comprises a voltage sensor 32 which provides analog signals indicative of voltage measurements on a signal line 34 and a current sensor 36 which provides analog signals indicative of a current measurements on a signal line 38. The analog signals on lines 34 and 38 are presented to an A/D (analog/digital) converter 40, which converts these analog signals to digital signals. The digital signals are transferred over a bus 42 to a microcontroller (signal processor) 44, such being commercially available from the Hitachi Electronics Components Group (Hitachi's H8/300 family of microcontrollers). Trip unit 30 further includes RAM (random access memory) 46, ROM (read only memory) 48 and EEPROM (electronic erasable programmable read only memory) 50 all of which communicate with the microcontroller 44 over a control bus 52. It will be appreciated that A/D converter 40, ROM 48, RAM 46, or any combination thereof may be internal to microcontroller 44, as is well known. EEPROM 50 is non-volatile so that system information and programming will not be lost during a power interruption or outage. Data, typically status of the circuit breaker, is displayed by a display 54 in response to display signals received from microcontroller 44 over control bus 52. An output control device 56, in response to control signals received from microcontroller 44 over control bus 52, controls a trip module 58 via a line 60. Calibration, testing, programming and other features are accomplished through a communications I/O port 62, which communicates with microcontroller 44 over control bus 52. A power supply 63 which is powered by the service electricity, provides appropriate power over a line 64 to the components of trip unit 30. ROM 48 includes trip unit application code, e.g., main functionality firmware, including initializing parameters, and boot code. The application code includes code for the fault prediction algorithm of the present invention.

EEPROM 50 includes operational parameter code, e.g., code for setting the near-trip event thresholds. These parameters may be stored in the trip unit at the factory and are selected to meet customers requirements, but can also be remotely downloaded as described hereinafter. The fault protection algorithm is run in real-time and is initiated preferably from the boot code at start up. In an exemplary embodiment of the invention, for each calculation made in the IED to determine if an event has occurred which merits a trip or relay action, a second comparison is made by the fault prediction algorithm to determine if a near-trip event has occurred.

Events that are typically calculated by IEDs include:

(1) comparing a measured quantity (such as phase current, phase voltage, frequency, or harmonic distortion) to a preset threshold setting and generating an event if the threshold is breached;

(2) comparing a measured quantity to a preset threshold setting and generating an event if the threshold is breached for a present time interval;

(3) comparing a measured rate of change to a preset threshold and generating an event if the threshold is breached;

(4) comparing a measured rate of change to a preset threshold setting and generating an event if the threshold is breached for a present time interval; and (5) variations on the above calculations where the measured quantity is an arithmetic composition of multiple separately measured quantities, such as: voltage phase A less voltage phase B; frequency phase A less frequency phase B; (voltage phase A less voltage phase B) divided by nominal voltage; and (frequency phase A less frequency phase B) divided by nominal frequency.

When a trip or relay event has been detected and a breaker tripped and/or a contact closed the device will send an event message out. This message may be displayed on a local display and/or be communicated to a remote monitoring station such as an in-equipment monitor or a remote computer with power management control software. However, as discussed above, at the point that a fault has occurred, detected by the trip unit or protective relay and the breaker tripped, irreparable damage and/or monetarily costly delays to facility operations will already have occurred.

In accordance with the present invention, for any of the events that are calculated by the IED the fault prediction algorithm calculates a near-trip event utilizing the following logic:
IF ( (preset trip condition less actual observed value) divided by preset trip condition $\geq$ customer input near-trip event threshold) THEN issue near-trip event.

A customer input near-trip event threshold is a number between, for example, 0.00 and 1.0. In the case of 0.00 threshold the near-trip event function is in effect turned off. In the case of 1.0 threshold the near-trip event and actual trip event are equivalent. For example, if the latest reading is 50 amps, the preset trip condition is 100 amps and the customer input near-trip event threshold is 0.4 then a near-trip event will be issued, i.e., (100 A–50 A)/(100 A)=0.5 which is greater than 0.4.

In the case of trip or relay events which involve a time interval, e.g., the event types 3 and 4 described above, the condition being compared is the time interval that a critical value has been breached for, e.g., if 'Long-Time' trip has been set for 100 amperes at 1 second, a counter will start when the amperage reading exceeds 100 amps. If after 0.5 seconds the reading again falls below 100 amps, the timer is stopped again. In this example the near-trip event condition was 0.5 second divided by 1.0 second. This means that if the customer input near-trip event threshold was set to 0.5 or below, then a near-trip event would be issued, and that if the customer near-trip event threshold was set higher than 0.5, then no near-trip event would be issued.

Alternatively, the fault prediction algorithm calculates a near-trip event utilizing the following logic:
IF (actual observed value $\geq$ ((preset trip condition multiplied by customer input near-trip event threshold) THEN issue near-trip event.

For example, if the latest reading is 50 amps, the preset trip condition is 100 amps and the customer input near-trip event threshold is 0.4 then a near-trip event will be issued, i.e., 50 A is greater than (100 A×0.4)=40 A. Moreover, the near-trip event threshold could be a selected level, e.g., in accordance with the above example the near-trip event threshold could be set at 40 amps.

The present invention has great diagnostic value for facility distribution systems having mission critical operations, since many facility fault conditions do not occur spontaneously but develop gradually over time.

In terms of communicating the occurrence of a near-trip event, this can occur in several ways: (1) generating an event message to be transmitted via a network connection to an attached computer (not shown) or other central monitoring device (not shown); (2) displaying a message on display 54 of the trip unit or breaker; or (3) closing a relay contact which in turn may be used to operate a horn, warning light or other alarm (not shown).

All of the aforementioned limits or settings are preferably stored in EEPROM 50 and can be altered by downloading desired settings via communications I/O port 62. This would include remotely downloading such data when the unit is connected to a system computer (not shown), either directly, over telephone lines, or any other suitable connection. It may also be preferred that EEPROM 50 comprises a flash memory whereby such data is flashed, as is well known.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of predicting fault conditions in an intelligent electronic device having a trip event threshold, said method comprising:

sensing an electrical signal to provide a sensed signal indicative of an electrical characteristic of the electrical signal;

comparing a rate of change in said sensed signal and a near-trip event threshold to detect a near-trip event, said near-trip event threshold defining said near-trip event before a potential trip event as defined by the trip event threshold of the intelligent electronic device; and generating a near-trip event signal when said near-trip event is detected.

2. The method of claim 1 wherein said comparing a rate of change in said sensed signal and said near-trip event threshold comprises comparing said rate of change in said sensed signal, said near-trip event threshold and a time interval.

3. The method of claim 1 wherein said comparing a rate of change in said sensed signal and said near-trip event threshold comprises:

subtracting said sensed signal from the trip event threshold to define a difference;

dividing said difference by the trip event threshold to define a quotient;

comparing said quotient to said near-trip event threshold; and detecting said near-trip event when said quotient is greater than or equal to said near-trip event threshold.

4. The method of claim 1 wherein the trip event threshold is associated with said electrical characteristic.

5. The method of claim 1 wherein the trip event threshold is associated with time.

6. The method of claim 1 wherein said comparing of said rate of change in said sensed signal and said near-trip event threshold comprises:

multiplying the trip event threshold and said near-trip event threshold to define a product;

comparing said product to said sensed signal; and detecting said near-trip event when said sensed signal is greater than or equal to said product.

7. The method of claim 1 wherein said electrical characteristic comprise electrical current.

8. The method of claim 1 wherein said electrical characteristic comprise electrical voltage.

9. The method of claim 1 further comprising:

remotely setting said near-trip event threshold.

10. The method of claim 1 wherein the intelligent electronic device comprises an electronic trip unit or a protective relay.

11. The method of claim 1 further comprising:

displaying information indicating the occurrence of said near-trip event.

12. An intelligent electronic device comprising:

a sensor for sensing an electrical signal to provide a sensed signal indicative to an electrical characteristic of the electrical signal; and a signal processor responsive to said sensed signal, and having memory for storing signals including program signals defining an executable program for, comparing a rate of change in said sensed signal and near-trip event threshold to detect a near-trip event, said near-trip event threshold defining said near-trip event before a potential trip event as defined by the trip event threshold of the intelligent electronic device, and generating a near-trip event signal when said near-trip event is detected.

13. The intelligent electronic device of claim 12 wherein comparing a rate of change in said sensed signal and said near-trip event threshold comprises comparing said rate of change in said sensed signal, said near-trip event threshold, and a time interval.

14. The intelligent electronic device of claim 12 wherein said comparing of rate of change in said sensed signal and said near-trip event threshold comprises:

subtracting said sensed signal from the trip event threshold to define a difference;

dividing said difference by the trip event threshold to define a quotient;

comparing said quotient to said near-trip event threshold; and detecting said near-trip event when said quotient is greater than or equal to said near-trip event threshold.

15. The intelligent electronic device of claim 12 wherein the trip event threshold is associated with said electrical characteristic.

16. The intelligent electronic device of claim 12 wherein the trip event threshold is associated with time.

17. The intelligent electronic device of claim 12 wherein said comparing of said rate of change in said sensed signal and said near-trip event threshold comprises:

multiplying the trip event threshold and said near-trip event threshold to define a product;

comparing said product to said sensed signal; and detecting said near-trip event when said sensed signal is greater than or equal to said product.

18. The intelligent electronic device of claim 12 wherein said electrical characteristic comprise electrical current.

19. The intelligent electronic device of claim 12 wherein said electrical characteristic comprise electrical voltage.

20. The intelligent electronic device of claim 12 wherein said program signals further define said executable program for remotely setting said near-trip event threshold.

21. The intelligent electronic device of claim 12 wherein the intelligent electronic device comprises an electronic trip unit or a protective relay.

22. The intelligent electronic device of claim 12 further comprising:

a display responsive to said near-trip event signal for displaying information indicating the detection of said near-trip event.

* * * * *